(12) United States Patent
Vandemark et al.

(10) Patent No.: US 10,577,797 B2
(45) Date of Patent: Mar. 3, 2020

(54) FIRE CONTAINMENT PANEL

(71) Applicants: Dylan Francis Vandemark, Hiram, ME (US); Matthew Lloyd Vandemark, Hiram, ME (US)

(72) Inventors: Dylan Francis Vandemark, Hiram, ME (US); Matthew Lloyd Vandemark, Hiram, ME (US)

(73) Assignee: CELLBLOCK FCS, LLC, Standish, ME (US)

( * ) Notice: Subject to any disclaimer, the term of this patent is extended or adjusted under 35 U.S.C. 154(b) by 207 days.

(21) Appl. No.: 15/715,909

(22) Filed: Sep. 26, 2017

(65) Prior Publication Data

US 2018/0087272 A1 Mar. 29, 2018

Related U.S. Application Data

(60) Provisional application No. 62/399,638, filed on Sep. 26, 2016.

(51) Int. Cl.

| | |
|---|---|
| *E04C 2/28* | (2006.01) |
| *C04B 28/04* | (2006.01) |
| *C04B 28/06* | (2006.01) |
| *B65D 90/22* | (2006.01) |
| *E04C 2/284* | (2006.01) |
| *E04B 1/14* | (2006.01) |
| *B65D 90/02* | (2019.01) |
| *C04B 111/28* | (2006.01) |
| *C04B 111/00* | (2006.01) |

(52) U.S. Cl.
CPC ............ *E04C 2/284* (2013.01); *B65D 90/022* (2013.01); *B65D 90/22* (2013.01); *C04B 28/06* (2013.01); *E04B 1/14* (2013.01); *C04B 28/04* (2013.01); *C04B 2111/00612* (2013.01); *C04B 2111/28* (2013.01)

(58) Field of Classification Search
None
See application file for complete search history.

(56) References Cited

U.S. PATENT DOCUMENTS

| | | |
|---|---|---|
| 6,686,003 B2 | 2/2004 | Legare |
| 7,849,648 B2 | 12/2010 | Tonyan et al. |
| 7,849,650 B2 | 12/2010 | Tonyan et al. |
| 8,038,790 B1 | 10/2011 | Dubey et al. |
| 8,122,679 B2 | 2/2012 | Tonyan et al. |
| 8,544,670 B2 | 10/2013 | Brilmyer |
| 8,876,968 B2 | 11/2014 | Revil et al. |
| 9,088,031 B2 | 7/2015 | Shimizu |
| 9,406,917 B2 | 8/2016 | Petzinger |
| 9,631,773 B2 | 4/2017 | Gehlhausen et al. |
| 9,725,365 B1 | 8/2017 | Zubrod |
| 2004/0101672 A1* | 5/2004 | Anton ............... C04B 28/06 428/307.3 |
| 2018/0282218 A1* | 10/2018 | Mabey ............... C04B 28/065 |

* cited by examiner

*Primary Examiner* — Sheeba Ahmed
(74) *Attorney, Agent, or Firm* — Shlesinger, Arkwright & Garvey, LLP

(57) ABSTRACT

A thermal barrier panel, the panel having a top face overlying a monolithic core, the core comprising a mixture of expanded glass granules, ceramic microspheres and a calcium aluminate cement binder, the expanded glass granules are selected from the group consisting of small granules having a size of about 0.5 mm to 1.0 mm, intermediate granules having a size of about 1.10 mm to 2.00 mm, and large granules having a size of about 2.10 mm to 4.00 mm wherein the volume of intermediate size granules comprises more than 50% of the mixture of expanded glass granules and the balance comprises small and large granules in a ratio of 1:2. The invention is also directed to a shipping container fitted with the fire containment panels of the present invention.

18 Claims, 3 Drawing Sheets

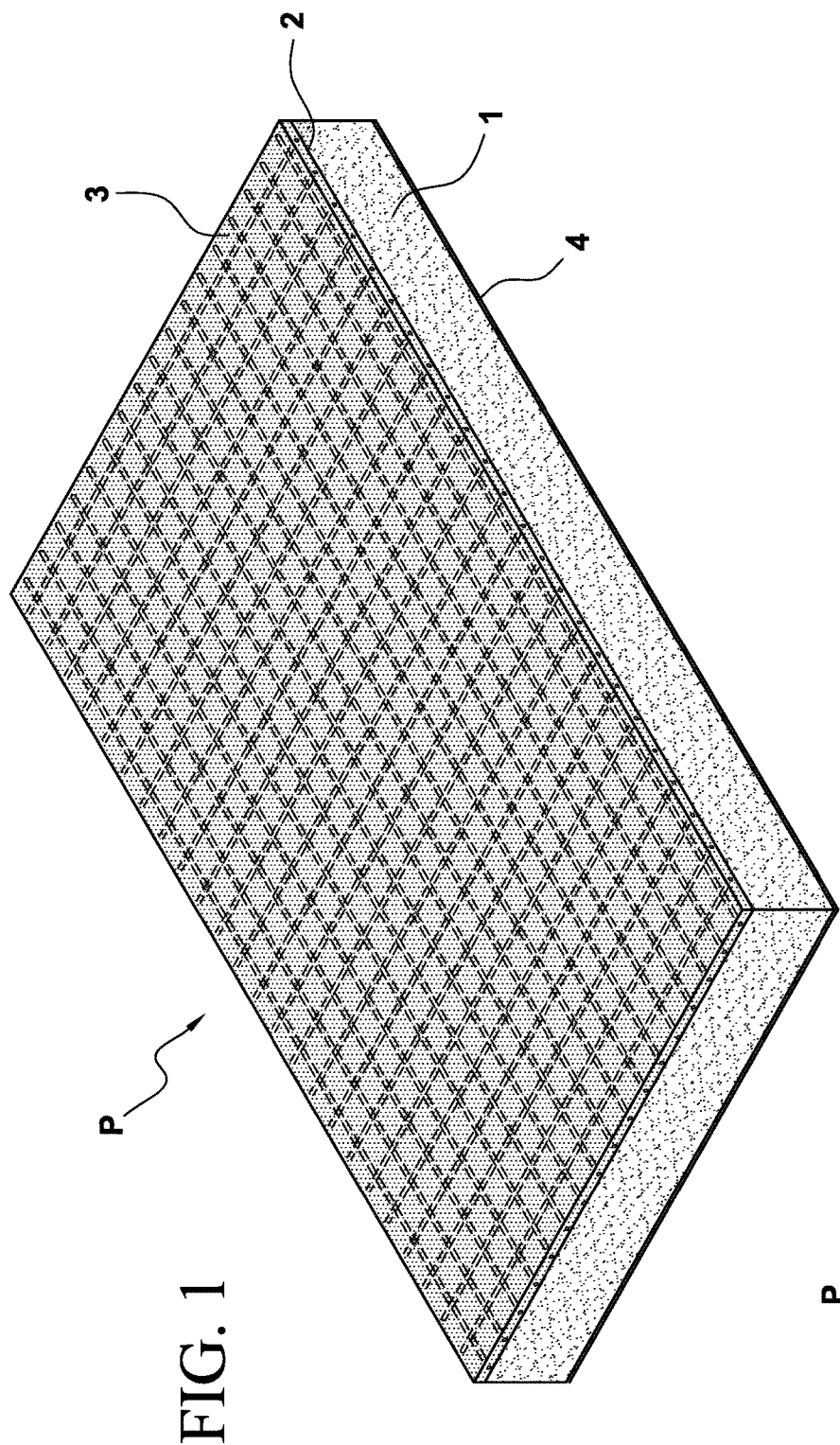
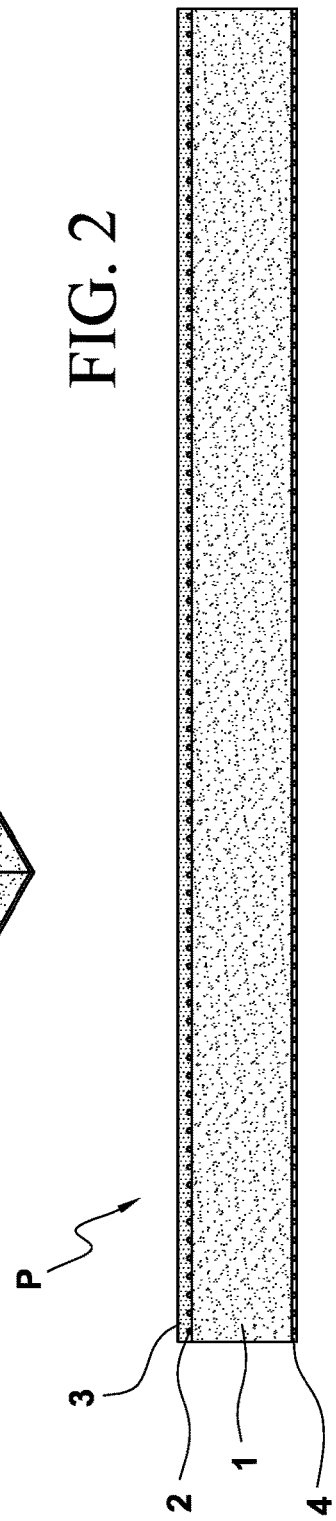

FIRE CONTAINMENT PANEL

This application claims the benefit of priority from U.S. Provisional Application Ser. No. 62/399,638, filed on Sep. 26, 2016, which is incorporated herein by reference.

FIELD OF THE INVENTION

The present invention relates to panels that are fire resistant and in particular, a fire resistant panel adapted for use in a shipping container or other fire containment structure.

BACKGROUND OF THE INVENTION

When handled improperly, or manufactured defectively, lithium-ion batteries are subject to thermal runaway i.e. the battery will spontaneously increase in temperature until it begins to vent hot pressurized gases. This eventually causes the battery to ignite, generating temperatures that can reach 2,000 degrees Fahrenheit. Because multiple batteries are often stored and packaged together during transport, thermal runaway of a single battery can ignite adjacent batteries. As is apparent, fires of this nature within the cargo hold of an aircraft have catastrophic potential.

It is known to use expanded glass as an aggregate within a panel to impart heat resistant characteristics. These panels employ resins or epoxy to bind the glass aggregate under high pressure. The panels are deficient for several reasons. First, they cannot withstand heat in excess of 400-600 degrees Fahrenheit which limits their application. The binders used in the prior art panels evaporate at that temperature resulting in structural failure of the panel.

In addition, prior art panels employ glass aggregate having a uniform size, typically the smallest size available, in an effort to impart rigidly to the panel. However, during manufacture of these panels, the high compression applied to the panel cause the binder to be forced into the air spaces of the small size glass aggregate which reduces the air content of the glass aggregate. The lower air content of the aggregate results in a panel having less heat resistance and no real capacity to handle temperatures of the type generated during a lithium-ion battery fire. Still other panels use a low grade Portland cement to bind the expanded glass aggregate. Although low grade Portland cement is non-combustible and more durable than epoxy or resin as a binder, long term fire exposure will eventually cause it degrade, resulting in panel failure.

A need has therefore existed in the art for a cementitious fire containment panel that overcomes the deficiencies of the prior art. The present invention provides a panel that is light in weight, possesses the flexural and tensile strength necessary for use in shipping containers or wall structures, yet is capable of withstanding temperatures in excess of 2,000 degrees Fahrenheit for sufficient periods of time.

BRIEF SUMMARY OF THE INVENTION

A thermal barrier panel, the panel having a top face overlying a monolithic core, the core comprising a mixture of expanded glass granules, ceramic microspheres and a calcium aluminate cement binder, the expanded glass granules are selected from the group consisting of small granules having a size from about 0.5 mm to 1.0 mm, intermediate granules having a size from about 1.10 mm to 2.00 mm, and large granules having a size from about 2.10 mm to 4.00 mm wherein the intermediate size granules comprises more than 50% by weight of the mixture of expanded glass granules and the balance comprises small and large granules provided in a ratio of 1:2. The invention is also directed to a shipping container fitted with the fire containment panels of the present invention.

BRIEF DESCRIPTION OF THE SEVERAL VIEWS OF THE DRAWINGS

FIG. 1 is a perspective view showing a first embodiment of the panel according to the present invention;

FIG. 2 is a cross-sectional view of the panel shown in FIG. 1;

DETAILED DESCRIPTION OF THE INVENTION

Figure 3:
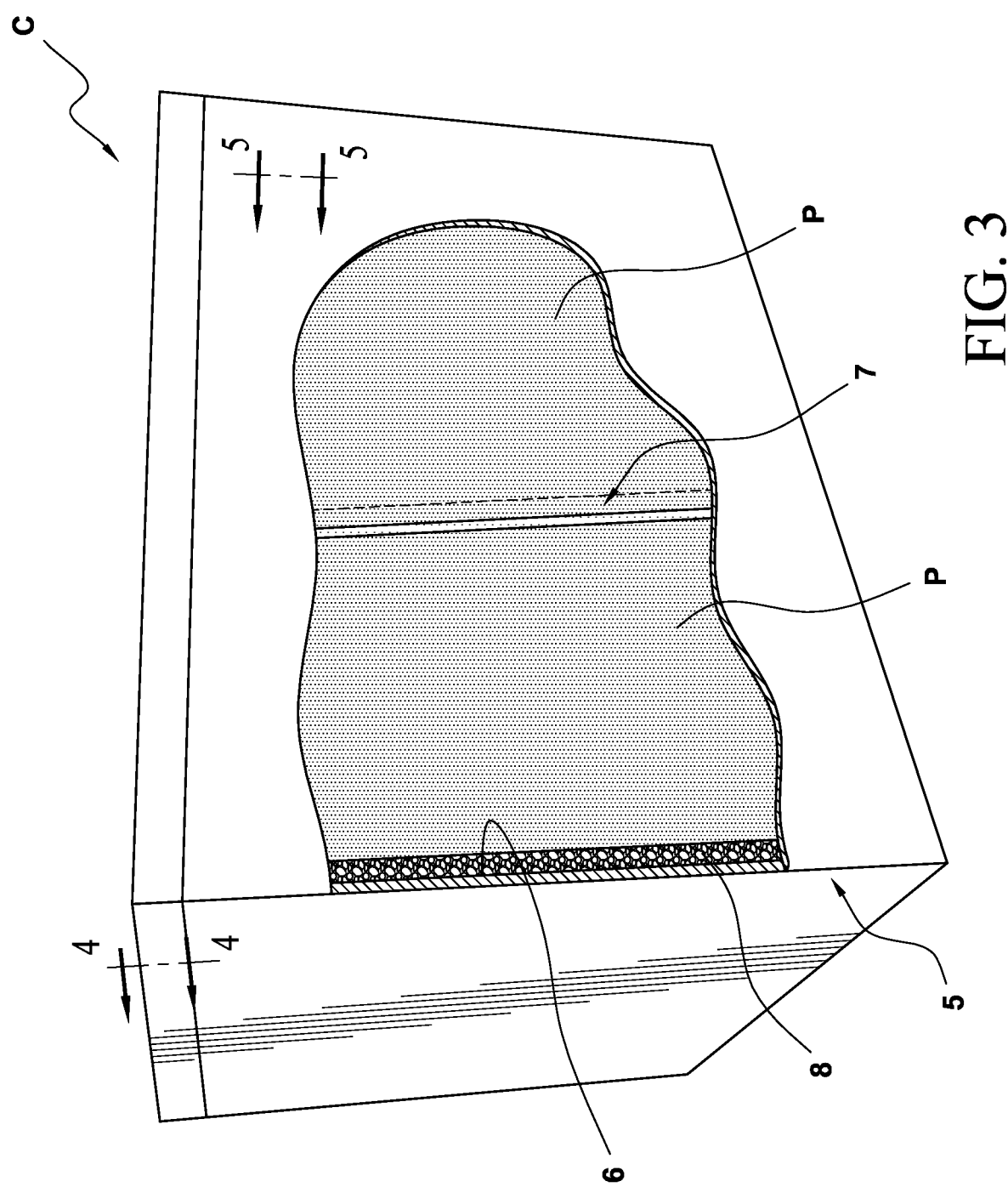
FIG. 3 is a perspective view showing a shipping container equipped with the panels according to the present invention.

As best shown in FIGS. 1 and 2, a fire containment panel P according to the present invention is shown. The panel P will preferably have a thickness between about ¾ of an inch to about 4 inches. The panel has a panel face 3 secured to a panel core 1. The core 1 functions as a heat sink during a thermal event by absorbing heat in a slow, controlled manner thereby preventing disintegration of the panel.

Expanded glass granules/aggregate comprise the majority of the panel core 1. The expanded glass aggregate comprises relatively small, lightweight spheres of foamed silicon dioxide glass having interior pores that form a closed cell structure. The size of the aggregate correlates to the interior pore size and hence density of the aggregate. A commercially available expanded glass granule within the scope of the present invention is sold by Dennert Poraver GmbH under their EXTOVER and PORAVER trademarks. The size of the expanded glass granule component in the present invention is non-uniform and comprises a blend of different size aggregate having varying densities due to the quantity of granules in the core and the pore size of those granules. The smallest size granules have the greatest density and smallest pore size while the largest sized granules have the lowest density and the largest pore size.

More particularly, the present invention comprise a combination of three different size expanded glass granules blended together. The smallest sized expanded glass aggregate, having the greatest density, have a diameter of about 0.50 mm to about 1.0 mm. The intermediate expanded glass aggregate, having moderate density, have a size greater than 1.00 mm up to about 2.0 mm. The largest expanded glass aggregate, having the lowest density, have a diameter greater than 2.0 mm to about 4.00 mm. The glass aggregate component at this gradation will have an overall air content between about 70% to about 80%.

Further, the expanded glass aggregate component of the core is provided as a blended mixture and in a preferred embodiment the smallest sized, highest density expanded glass aggregate comprise about 18% of the total expanded glass component, the intermediate sized expanded glass granules comprise about 45.5% of the total expanded glass component, and the largest sized expanded glass granules, having the lowest density, will comprise about 36.5% of the total expanded glass component. Thus, the optimum ratio of the smallest expanded glass aggregate to the largest expanded glass aggregate is about 1:2 with the intermediate size expanded glass aggregate comprising the balance. It is within the scope of the present invention to vary the respective percentages depending upon the desired weight and strength (flexural and compressive) of the desired panel due its end use.

The second component of the panel core 1 is a calcium aluminate cement binder. This binder has a high alumina content, namely an alumina content no less than about 53%. The use of a high alumina cement binder impart superior refractory characteristics to the overall panel during a thermal event i.e. the alumina in the binder renders the panel even more heat resistant due to its capacity to undergo ceramic phase change. At high temperatures (~600 degrees Celsius) the ceramic phase change of the alumina increases the hardness of the binder rendering the panel core more heat resistant. A 40% alumina content cement is commercially available from Calucem and sold under the tradename REFCON MG.

The third component forming the panel core 1 are high alumna cenospheres. Cenospheres are lightweight, hard, inert, hollow spheres primarily composes of silica and alumina that exhibit a closed pore structure within the aggregate. Preferred alumina cenospheres have an alumina content comprising no less than about 40% and are about 300 microns in diameter. The function of the high alumina cenosphere is to impart density to the core due to their size along with enhanced heat resistance due to the high alumina content. During a high thermal event, when at least some of the smaller sized expanded glass aggregate component begin to melt and degrade, the high alumina cenosphere resist melting thereby offsetting any structural degradation of some of the expanded glass aggregate. The cenospheres may be provided as a blend of various sizes. For example, 40-50% may consist of 180-300 microns, 25-30% may consist of <180-300 microns, 10-15% may consist of <150-106 microns, 5-15% may consist of <106-75 microns, and 2-10% may consist of <75 microns.

The fourth component forming the panel core 1 are propylene fibers. The fibers increase the strength of the panel is two ways. First, they contribute to the flexural and tensile strength of the panel under normal circumstances. Second, in a high heat event the polypropylene fibers melt or otherwise vaporize and leave behind channels within the interior of the panel that mitigate the expansive pressures generated by heat. The expanding water and air in the core during a fire fill the channels. This prevents cracking of the panel which would otherwise occur due to the lack of a mechanism to mitigate expansive pressures. In a preferred embodiment the propylene fibers have a length of about 12 mm. It is within the scope of the invention to vary the length of the fibers depending upon the preferred physical characteristics of the panel. A commercially available fiber according to the present invention is the Baumheuter polypropylenes Eurofiber.

Returning to FIGS. 1 and 2, the panel face 3 is shown as including a first fiberglass mesh member 2 embedded within panel face 3. The mesh member is an alkali resistant glass mesh provided to absorb flexural stressors placed on the panel during shipping, installation and/or general usage. A suitable fiberglass mesh will have a ¼ inch weave for a panel 3×5 ft. and ½ inch thickness. A second alkali resistant mesh member 4 is provided on the underside of the panel and directly on core 1 which will be further explained below. The size of the openings in the mesh and the thickness of the mesh are variable depending on the end use of the panel or to otherwise impart a desired flexural or tensile characteristic to the overall panel. A suitable commercially available mesh member is the St. Goban mesh.

The panel face is comprises a high alumna cenospheres and a calcium aluminate cement binder. The ratio of cenospheres to binder is approximately 1:4. The panel face is the densest component of the panel and the most durable due to the use of (1) alumina cenospheres having an alumina content comprising no less than about 40% and a diameter of about 300-400 microns in diameter and (2) a high calcium aluminate cement binder. The high alumina cenospheres impart greater density to the panel face due to their size and enhanced heat resistance to the face of the panel due to the high alumina content of the cenospheres and the binder. A preferred mix for the face panel, which is scalable, is 14% cenospheres, 57.5% calcium alumina cement, balance water.

A representative panel according to the present invention together with a method for making the panel is as follows:

The ingredient mix for the panel core 1 is obtained by providing an expanded glass aggregate component comprising 0.86 lbs. of expanded glass having a diameter from 0.5 through 1 mm size, 2.16 lbs. of expanded glass aggregate having a diameter 1 through 2 mm size and 1.73 lbs. of expanded glass aggregate having a diameter of 2 through 4 mm. size. Calcium aluminate cement binder is added in the amount of 10.8 lbs. Cenospheres as described earlier are added in the amount of 1.68 lbs. and 0.0165 lbs. of 12 mm lengths of polypropylene fibers added together with 5.2 lbs. water. Thus, the overall core is formed from 21.15% of expanded glass aggregate in the size ratios as described, 48.1% of calcium aluminate cement binder, 7.48% of high alumina cenospheres, 0.0165 lbs. of polypropylene fibers and 23.16% water. The ingredients are mixed for about 60 seconds.

A 3'×5' mold having a 5" depth is provided. The interior face of the mold is covered with a sheet of clear Mylar to promote release of the finished panel from the mold. The alkali resistant mesh 2 having a 4" weave is place onto the Mylar sheet. The coating forming the panel face 3 is then prepared by combining lbs. of high alumina 300 micron cenospheres with 2.0 lbs. of the high alumina calcium cement and water. The composition is then mist coated onto the mesh to a thickness of about 1 mm. The core mix described earlier is then poured into the mold on top of the panel face coating containing the alkali resistant mesh. The mold is vibrated to settle the core mixture and additional mix may then be added followed by mold vibration until a desired thickness is reached. The second alkali resistant mesh 4 is provided on top of the core material in the mold and troweled to imbed it into the back face of the core. A second Mylar sheet is then applied over the mold contents and the mold is transferred to a hydraulic press where it is pressed at 20 psi for 5 minutes. The mold is then removed from the press and the second Mylar sheet is pulled off the mold. The mold is covered and allowed to cure for 24 hours. The panel is extracted from the mold and the first Mylar sheet is peeled off the finished product. The finished panel has a density of 501 lbs./cu.ft.

Turning to FIG. 3, a lithium ion battery shipping container C having the fire containment panels P of the present invention is shown. The container is an aluminum shell 5 having internal supports (not shown) for fastening the panels P together along overlapping joints or seams 7. The aluminum shell 5 contains an airspace 8 between the interior surface 6 of the container C and the exterior surface of the panel P. The airspace 8 is filled with loose expanded glass aggregate of a desired size. This container C is highly insulative and smoke absorbent and capable of safely transporting hazardous lithium ion batteries.

Figure 4:
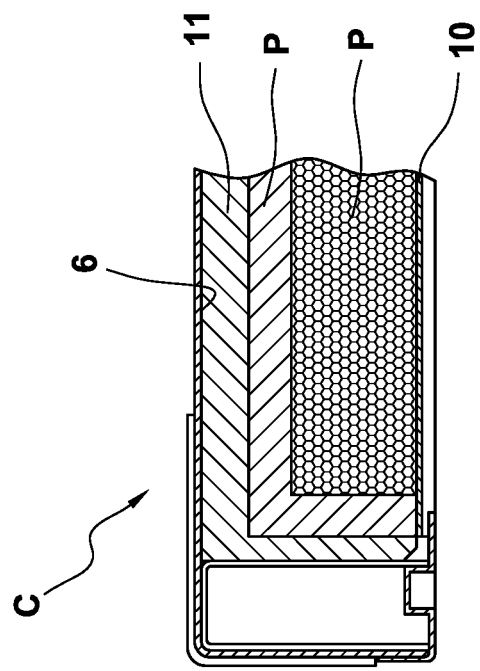
FIG. 4 is a sectional view of the container lid taken along lines 4-4 in FIG. 3.

FIG. 4 illustrates a lid portion of the container shown in FIG. 3 wherein a quick burn fabric liner 10 is provided against a first panel P having a desired heat resistance and rigidity which abuts a second panel P having a different heat resistance and rigidity. An aerogel felt layer 11 is provided between the second panel P and the container shell.

Figure 5:
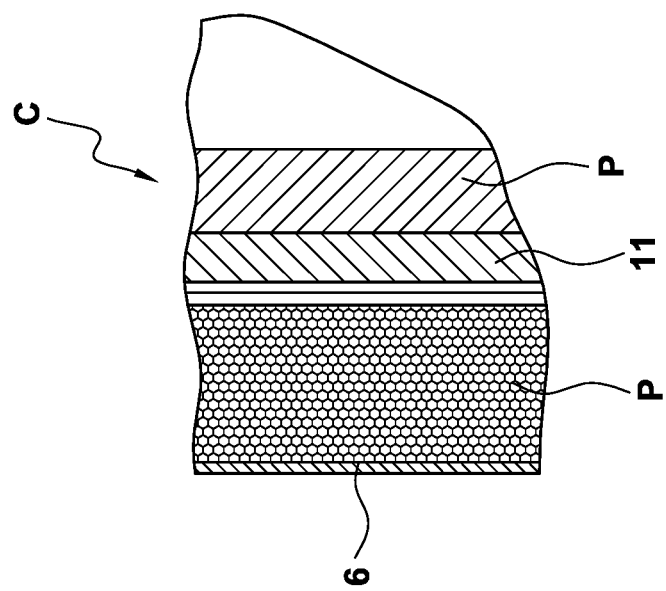
FIG. 5 is a sectional view of an alternative embodiment of the container wall taken along lines 5-5 in FIG. 3.

FIG. 5 illustrates a alternative embodiment of the container wall wherein the aerogel felt layer 11 is provided between the first panel P having a desired heat resistance and rigidity and the second panel P having a different heat resistance and rigidity and an open space is provided between the aerogel layer and the first panel P.

While this invention has been described as having a preferred design, it is understood that it is capable of further modifications, uses and adaptations, both in whole and in part, while following the general principle of the invention and including such departures from the present disclosure as is known or customary practice in the art to which this invention pertains, and as may be applied to the central features of this invention.

We claim:

1. A thermal barrier panel, the panel comprising a top surface overlying a monolithic core, the core comprising a mixture of expanded glass granules, ceramic microspheres and a calcium aluminate cement binder, the expanded glass granules are selected from the group consisting of small granules having a size from about 0.5 mm to 1.0 mm, intermediate granules having a size from about 1.10 mm to 2.00 mm, and large granules having a size from about 2.10 mm to 4.00 mm wherein the volume of intermediate size granules comprises more than 50% of the mixture of expanded glass granules and the balance comprises small and large granules in a ratio of 1:2.

2. The thermal barrier panel of claim 1 and wherein the monolithic core has an total air content of about 70% to about 80% by volume.

3. The thermal barrier panel of claim 1 and wherein the small expanded glass granules comprise about 18% of the total mixture of the expanded glass granules, the intermediate expanded glass granules comprise about 45.5% of the total mixture of the expanded glass granules, and the large expanded glass granules comprise about 36.5% of the total mixture of the expanded glass granules.

4. The thermal barrier panel of claim 1 and wherein the calcium aluminate cement binder has an alumina content of no less than 53% by volume.

5. The thermal barrier panel of claim 1 and wherein the ceramic microspheres are high alumina cenospheres having an alumina content of no less than 40% by volume and a diameter of about 300 microns.

6. The thermal barrier panel of claim 5 and wherein the ceramic microspheres are a blend of different size microspheres of about 75 microns to about 300 microns in diameter.

7. The thermal barrier panel of claim 1 and wherein the core further comprises polypropylene fibers that function as a sacrificial component when the panel is exposed to high heat.

8. The thermal barrier panel of claim 1 and wherein the panel face comprises as mixture of a high-alumina cenospheres component intermixed with a calcium aluminate cement binder, the ratio of cenospheres to binder is about 1:4 by volume.

9. The thermal barrier panel of claim 8 and wherein the panel face cenospheres have an alumina content of not less than 40% by volume and a diameters of about 300 to about 400 microns.

10. A shipping container, the shipping container comprising:
    a) a shell, the shell having a top, a bottom and sidewalls, the shell including an interior surface and an exterior surface;
    b) a series of thermal barrier panels, the thermal barrier panels are fixed adjacent the interior surface of the shell;
    c) expanded glass granules, the expanded glass granules are disposed between the series of thermal barrier panels and the interior surface of the shell;
    d) each of the thermal barrier panels has a top surface overlying a monolithic core, the core comprising a mixture of expanded glass granules, ceramic microspheres and a calcium aluminate cement binder, the expanded glass granules are selected from the group consisting of small granules having a size from about 0.5 mm to 1.0 mm, intermediate granules having a size from about 1.10 mm to 2.00 mm, and large granules having a size from about 2.10 mm to 4.00 mm wherein the volume of intermediate size granules comprises more than 50% of the mixture of expanded glass granules and the balance comprises small and large granules in a ratio of 1:2.

11. The shipping container of claim 10 and wherein the monolithic core has an total air content of about 70% to about 80% by volume.

12. The shipping container of claim 10 and wherein the small expanded glass granules comprise about 18% of the total mixture of the expanded glass granules, the intermediate expanded glass granules comprise about 45.5% of the total mixture of the expanded glass granules, and the large expanded glass granules comprise about 36.5% of the total mixture of the expanded glass granules.

13. The shipping container of claim 10 and wherein the calcium aluminate cement binder has an alumina content of no less than 53% by volume.

14. The shipping container of claim 10 and wherein the ceramic microspheres are high alumina cenospheres having an alumina content of no less than 40% by volume and a diameter of about 300 microns.

15. The shipping container of claim 14 and wherein the ceramic microspheres are a blend of different size microspheres of about 75 microns to about 300 microns in diameter.

16. The shipping container of claim 10 and wherein the core further comprises polypropylene fibers that function as a sacrificial component when the panel is exposed to high heat.

17. The shipping container of claim 10 and wherein the panel face comprises as mixture of a high-alumina cenospheres component intermixed with a calcium aluminate cement binder, the ratio of cenospheres to binder is about 1:4 by volume.

18. The shipping container of claim 17 and wherein the panel face cenospheres have an alumina content of not less than 40% by volume and a diameters of about 300 to about 400 microns.

* * * * *